(12) United States Patent
Chaudry et al.

(10) Patent No.: US 10,582,804 B2
(45) Date of Patent: Mar. 10, 2020

(54) COOKING APPARATUS WITH GREASE STRAINER

(71) Applicants: Adam Chaudry, Powell, OH (US); Josh Conway, Powell, OH (US); Joseph Lehman, New Albany, OH (US); Sean D Montag, Westerville, OH (US)

(72) Inventors: Adam Chaudry, Powell, OH (US); Josh Conway, Powell, OH (US); Joseph Lehman, New Albany, OH (US); Sean D Montag, Westerville, OH (US)

( * ) Notice: Subject to any disclaimer, the term of this patent is extended or adjusted under 35 U.S.C. 154(b) by 290 days.

(21) Appl. No.: 14/949,192

(22) Filed: Nov. 23, 2015

(65) Prior Publication Data

US 2016/0367079 A1 Dec. 22, 2016

Related U.S. Application Data

(60) Provisional application No. 62/183,001, filed on Jun. 22, 2015, provisional application No. 62/208,104, filed on Aug. 21, 2015.

(51) Int. Cl.
*A47J 37/10* (2006.01)

(52) U.S. Cl.
CPC .................... *A47J 37/108* (2013.01)

(58) Field of Classification Search
CPC .......... A47J 37/108; A47J 36/00; A47J 36/14; A47J 36/08; A47J 36/06; A47J 27/00; A47J 2027/008; A47J 2027/006; A47J 19/005; A47J 37/10; A47J 43/24; A47J 36/16; A47J 37/101; B01D 29/0097; B01D 29/96; B01D 29/965; B01D 35/027; B01D 35/28

USPC ......... 99/444, 324, 340, 359, 373, 375, 391, 99/396, 398, 400, 407, 408, 410, 423, 99/424, 446, 449, 425, 422, 495, 496, 99/341, 348, 352, 395, 403, 426, 645, 99/646; 220/573.1, 912, 845, 810; 210/473, 474, 475, 477; 126/373.1, 126/376.1, 377.1, 383.1, 384.1, 355.1

See application file for complete search history.

(56) References Cited

U.S. PATENT DOCUMENTS

| | | | | |
|---|---|---|---|---|
| 1,916,710 A | * | 7/1933 | Alexander | A47J 36/08 210/469 |
| 4,519,520 A | * | 5/1985 | Hill | A47G 19/2205 220/263 |
| 2004/0250690 A1 | * | 12/2004 | Restis | A47J 36/08 99/403 |
| 2006/0070944 A1 | * | 4/2006 | Ahn | A47J 27/10 210/470 |

(Continued)

FOREIGN PATENT DOCUMENTS

WO   WO-2008036785 A2 *   3/2008   ............. A47J 36/20

*Primary Examiner* — Tu B Hoang
*Assistant Examiner* — Masahiko Muranami
(74) *Attorney, Agent, or Firm* — Miracle IP; Bryce D. Miracle

(57) ABSTRACT

A cooking pan having a pivoting strainer which provides a unique, safe way to drain grease contained within a pan while cooking. The cooking pan generally comprises a substantially flat and circular base having a cooking surface, a peripheral wall upstanding from the circular base, a pan handle extending outwardly from the peripheral wall and a pivoting strainer moveable between a closed position and a raised, draining position.

6 Claims, 21 Drawing Sheets

(56) References Cited

U.S. PATENT DOCUMENTS

| | | | |
|---|---|---|---|
| 2013/0025469 A1* | 1/2013 | Cloutier | A47J 36/06 |
| | | | 99/352 |
| 2013/0025470 A1* | 1/2013 | Venot | A47J 36/20 |
| | | | 99/409 |
| 2014/0251890 A1* | 9/2014 | Miller | A47J 43/24 |
| | | | 210/238 |
| 2017/0303743 A1* | 10/2017 | Chaudry | A47J 37/108 |

* cited by examiner

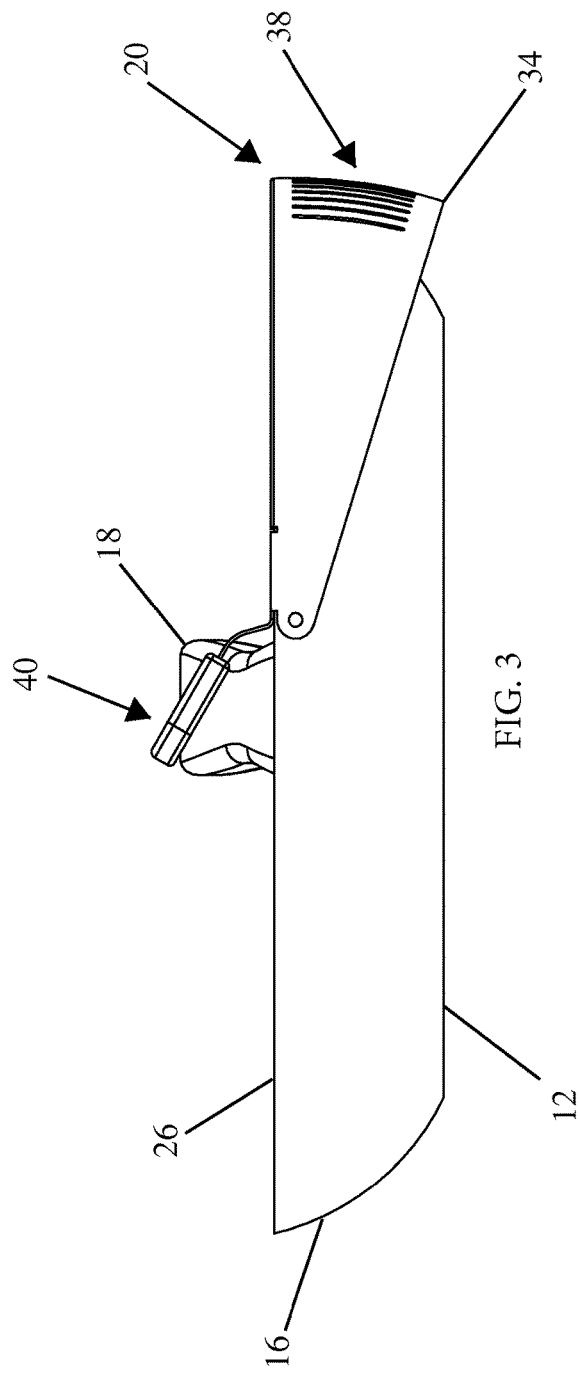
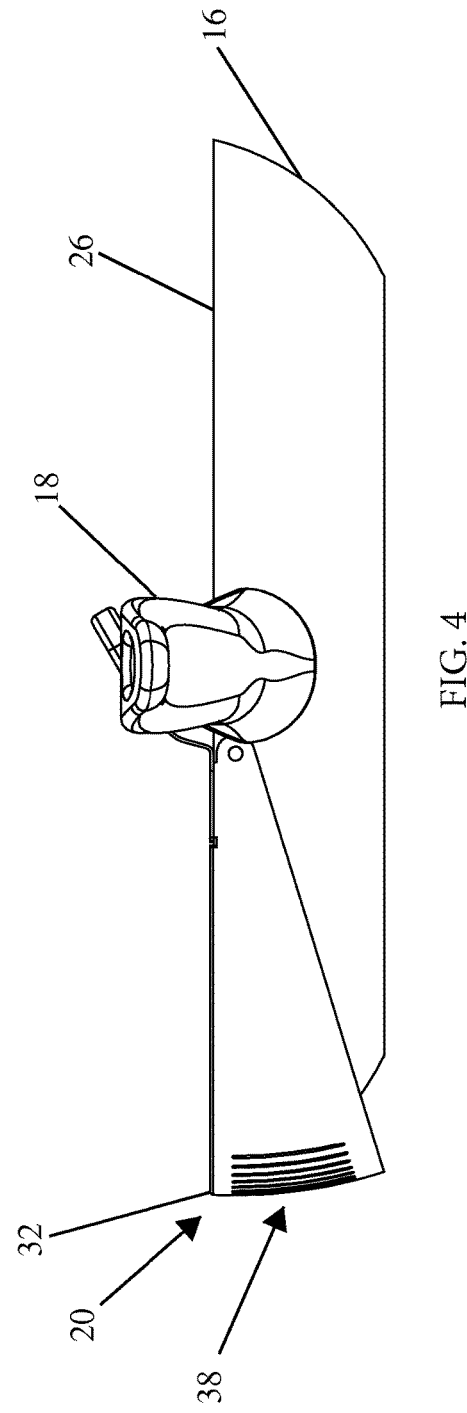

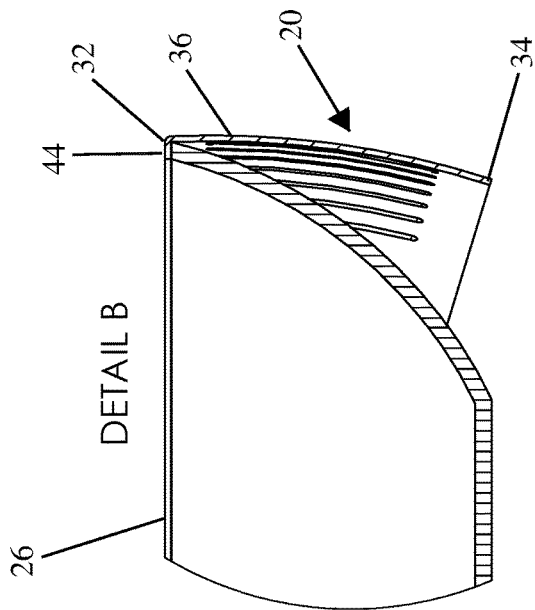
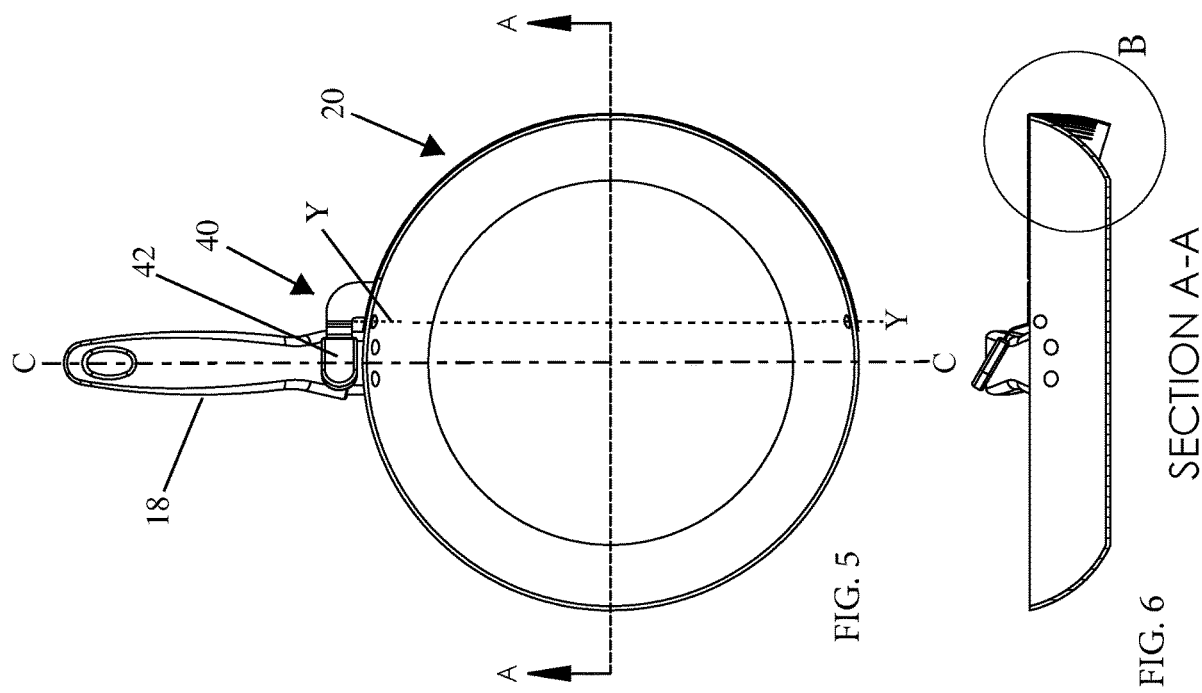

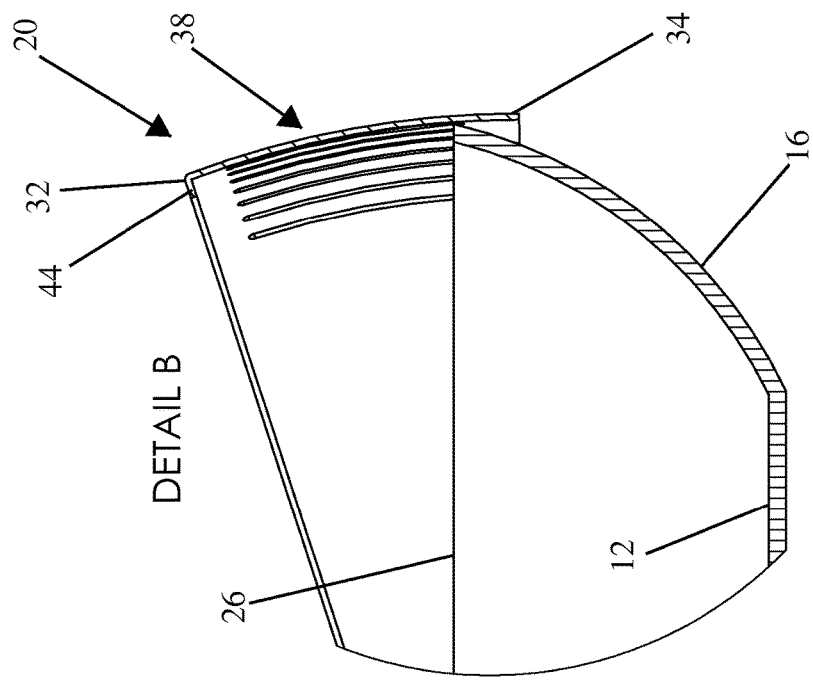
FIG. 16
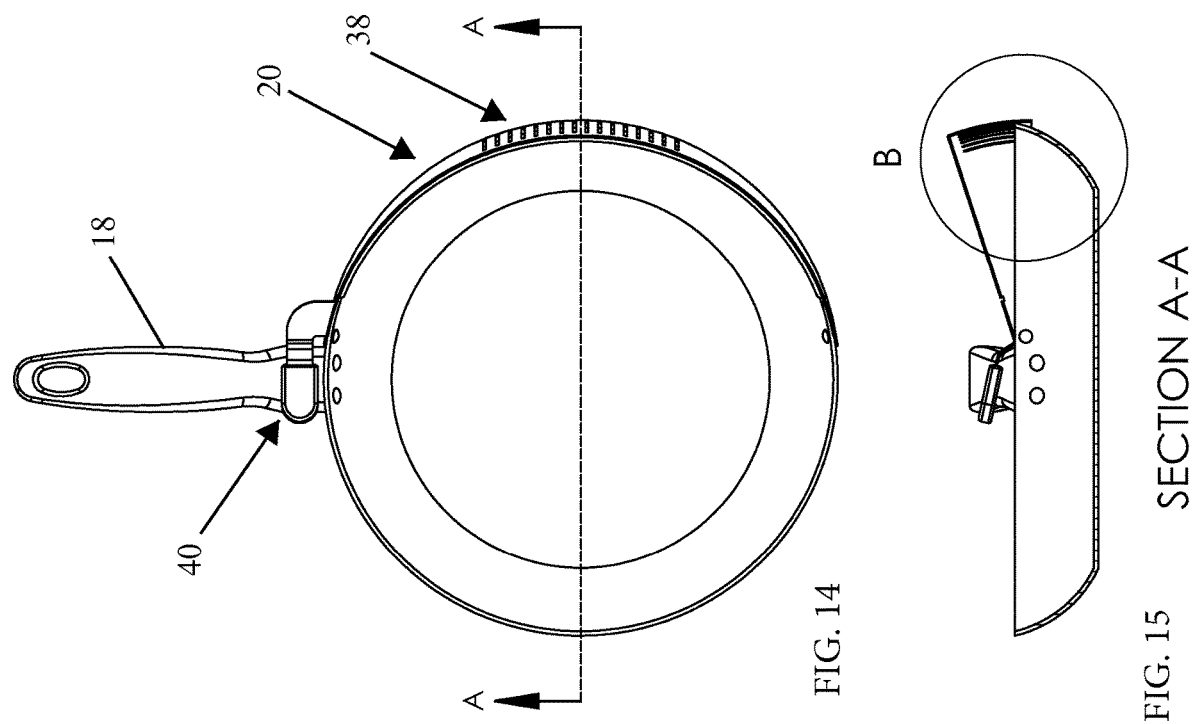
FIG. 14
FIG. 15

COOKING APPARATUS WITH GREASE STRAINER

This application is based upon and claims the priority filing date of the previously filed, U.S. Provisional patent application entitled "Cooking Apparatus with Grease Strainer" filed Jun. 22, 2014, Ser. No. 62/183,001, the entire disclosure of which is hereby incorporated herein by reference and U.S. Provisional patent application entitled "Cooking Apparatus with Grease Strainer" filed Aug. 21, 2015, Ser. No. 62/208,104 the entire disclosure of which is hereby incorporated herein by reference.

BACKGROUND

The present invention relates to a cooking pan and, in particular, to an improved cooking pan having a grease strainer that does not compromise the cooking surface and containment of food therein.

Cooking pans are well known in the culinary utensil art. A cooking pan may also be known as a frying pan, frypan, or a skillet. Cooking pans are generally a flat-bottomed pan used for frying, searing, and browning foods. The typical cooking pan is 8 to 12 inches in diameter with relatively low sides that flare outwards, a long handle, and no lid. Larger pans may have a small grab handle opposite the main handle. Traditionally, frying pans were made of cast iron. Although cast iron is still popular today, especially for outdoor cooking, most frying pans are now made from metals such as aluminum or stainless steel.

Cooking pans typically are relatively satisfactory for their intended purposes. However, on the other hand, the conventional cooking pan lacks special features that may increase the efficiency and ease of use of preparing food in a pan.

When it comes to attempting to drain a pan of grease or other liquid while keeping the solid food within, it can be quite the challenge for even a seasoned professional chef. Grease and other liquids are generally very hot and must be handled with extreme care. Not only is it difficult to ascertain the proper angle at which the pan must be tilted in order to commence the liquid drainage, but the angle must be slowly increased to maintain liquid flow. Accordingly, both chefs and amateur cooks tend to use a supporting culinary utensil, such as a pan cover or a large spoon or fork, to assist in draining the excess liquid by attempting to retain the solid food within the pan while allowing the liquid to drain over out of the pan. This process can prove to be awkward and if not done properly, hot liquids can spill or splash onto the handler, causing severe burns.

For the foregoing reason, there is a need for a cooking pan that will provide an efficient cooking surface as well as provide a safe and reliable manner of disposing of hot liquids contained therein.

SUMMARY

In accordance with the invention, a cooking pan apparatus is provided which boasts the ability to provide a continuous cooking surface as well as provide a unique "flip up" or pivoting strainer moveable between a lowered, closed position to a raised, draining position for preventing burns and other injuries relating to draining a cooking pan of its liquid contents. This provides a safe, ergonomic, and efficient cooking pan apparatus.

The cooking pan for straining grease and other liquid components away from solid food, generally comprises: (a) a base having a cooking surface; (b) a peripheral wall upstanding from the base terminating with an upper curved rim; (c) a handle extending outwardly from the peripheral wall; (d) a pivoting strainer moveable relative to a limited segment of the peripheral wall and upper curved rim, the pivoting strainer comprising a curved surface generally concentric to that of the upper curved rim and defining drainage perforations; and (e) a lever for moving the pivoting strainer relative to the upper curved rim between i) a draining position wherein the pivoting strainer extends above a limited segment of the peripheral wall and upper curved rim exposing the drainage perforations to the interior contents of the pan, thereby enabling the passage of liquid components from the interior of the pan to the exterior of the pan; and ii) a closed position wherein the pivoting strainer is positioned such that it does not interfere with the conventional configuration of the cooking pan and cooking surfaces.

In a detailed version of the invention, the pivoting strainer further comprises a lower terminating perimeter which is concentric to the upper curved rim of the cooking pan, wherein while in draining position the lower terminating perimeter couples with the upper curved rim by an interference type fit, thereby preventing the pivoting strainer from moving upward and providing a seal between the pan and the pivoting strainer during the straining process.

In yet another version, the pivoting strainer further comprises an upper perimeter terminating at a tip which is concentric to the upper curved rim of the pan, wherein while in the closed position the lip overlaps the upper curved rim, thereby preventing the pivoting strainer from moving downward and providing a seal between the pan and the pivoting strainer.

Moreover, in a detailed version of the invention, the lever for moving the pivoting strainer can be actuated by a user's thumb while holding the cooking pan by the handle, the lever is operably attached to the pivoting strainer which is rotatable about the pivot axis and extends above the pan handle proximate the user's thumb, thereby as the lever is depressed by the user's thumb while holding the handle, the pivoting strainer pivots about the pivot axis moving from the closed position to the draining position.

These and other features of the present invention will become readily apparent upon further review of the following specification and drawings.

DESCRIPTION OF THE DRAWINGS

These and other features, aspects, and advantages of the present invention will become better understood with regard to the following description and accompanying figures where:

FIG. 3 is a side elevation view of the version shown in FIG. 1;

FIG. 4 is handle side elevation view of the version shown in FIG. 1;

FIG. 5 is a top plan of the version shown in FIG. 1;

FIG. 6 is a cross sectional view taken along lines A-A of FIG. 5;

FIG. 7 is an up-close detailed view of the pivoting strainer taken at B of FIG. 6;

FIG. 14 is a top plan of the version shown in FIG. 1 while pivoting strainer is in the draining position;

FIG. 15 is a cross sectional view taken along lines A-A of FIG. 14;

FIG. 16 is an up-close detailed view of the pivoting strainer while in the draining position taken at B of FIG. 6;

DETAILED DESCRIPTION

Referring now to the figures wherein the showings are for purposes of illustrating a preferred version of the invention only and not for purposes of limiting the present invention is a cooking pan having a pivoting strainer which provides an unique, safe way to drain grease contained within a pan while cooking.

The following detailed description is of the best currently contemplated modes of carrying out exemplary versions of the invention. The description is not to be taken in the limiting sense, but is made merely for the purpose illustrating the general principles of the invention, since the scope of the invention is best defined by the appended claims.

Various inventive features are described below that can each be used independently of one another or in combination with other features.

Figure 1:
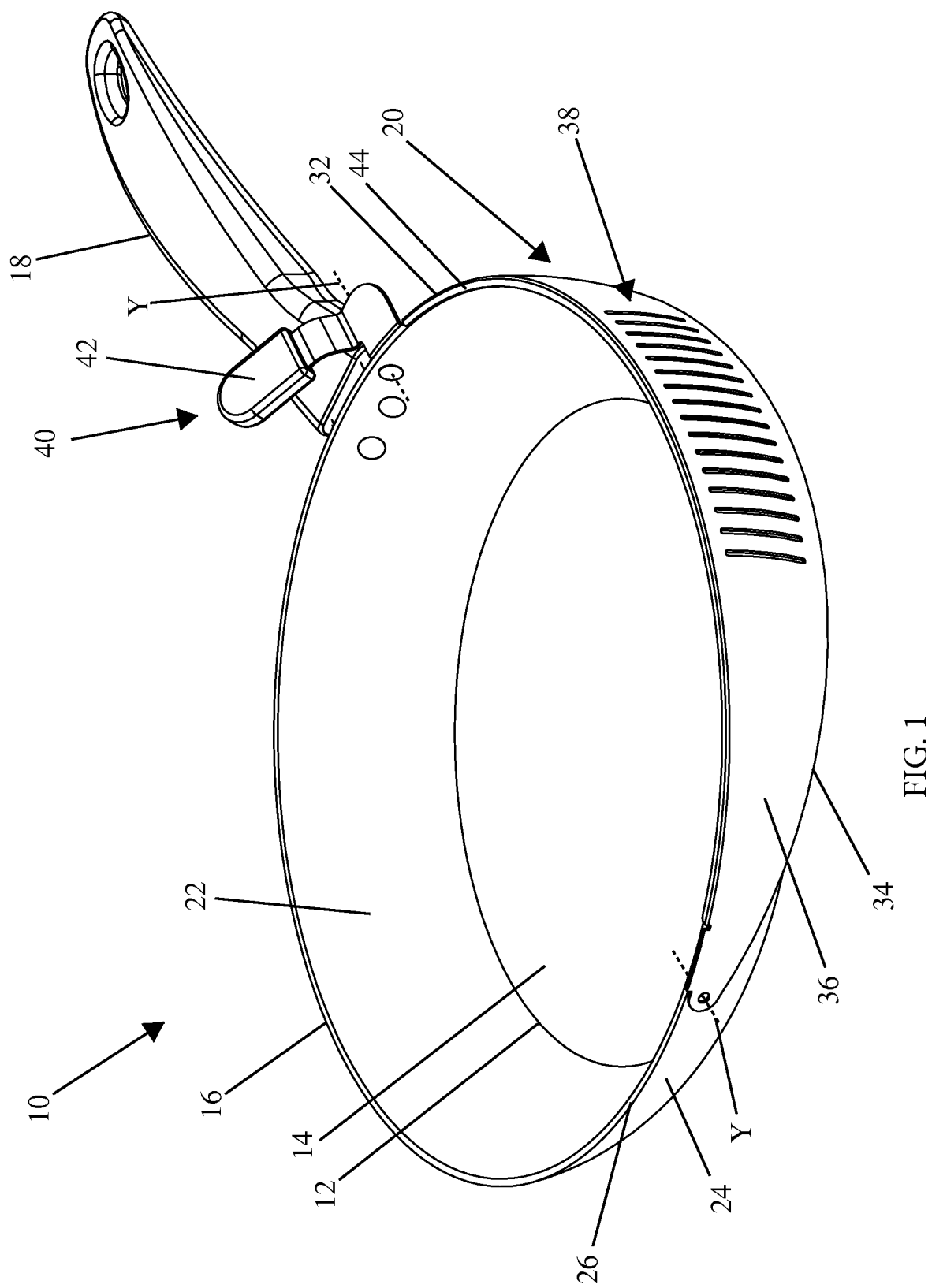
FIG. 1 is front, side perspective view of a first version of the invention with the pivoting strainer in the closed position.
Figure 2:
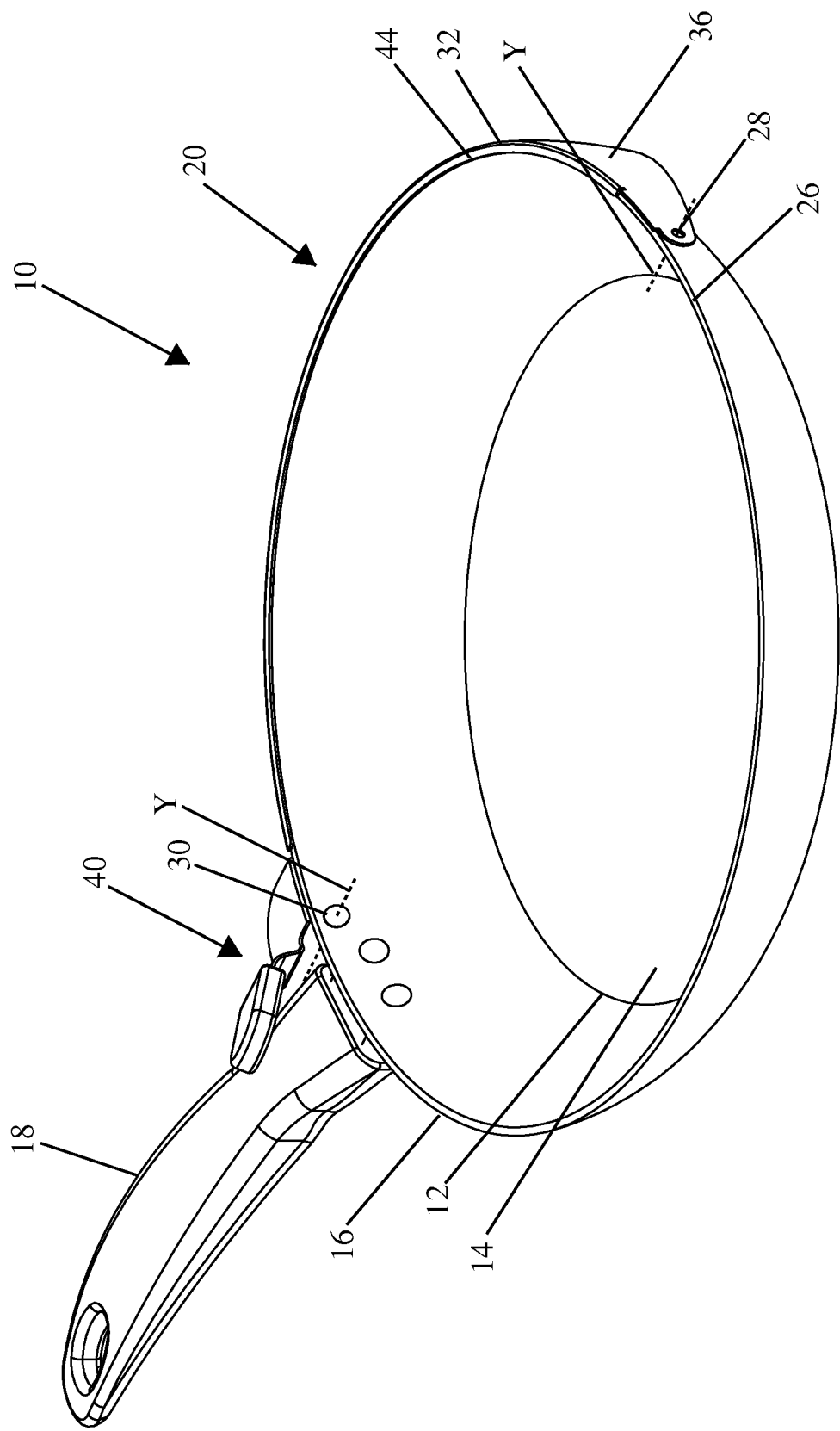
FIG. 2 is rear, side perspective view of the version shown in FIG. 1.

With reference to the figures, particularly FIG. 1 and FIG. 2 thereof, therein illustrated is a pan having a pivoting strainer according to a first embodiment of the present invention, generally designated by numeral 10. FIG. 1 is an illustrative interior perspective view showing the version 10 in a closed configuration. The cooking pan 10 generally comprises a substantially flat and circular base 12 having a cooking surface 14, a peripheral wall 16 upstanding from said circular base 12, a pan handle 18 extending outwardly from the peripheral wall 16 and a pivoting strainer 20 moveable between a closed position and a raised, draining position.

The circular base 12 and cooking surface 14 are conventional in nature. Ideally, the cooking surface 14 is generally flat and configured to cook and transfer heat to food as customary known in the culinary art. It will be noted, that the base 12 may be other than totally flat and other than exactly circular, just as the peripheral wall 16 may extend either vertically (perpendicular to the base) or slightly outward as well—either linearly or arcuately. The circular base 12 and peripheral wall 16 are imperforate and cooperate to define an open-top container for holding the food to be cooked, including any liquid associated therewith.

In particular, the peripheral wall 16 comprises an interior surface 22 and an exterior surface 24. Generally speaking, in the version 10, the peripheral wall 16 has a curved cross section (see FIG. 5-FIG. 7), showing the peripheral wall 16 extending outward and upward from the base 12 terminating with an upper curved rim 26. Alternatively, it will be known that the peripheral wall 16 upstanding from the base 12 may have a linear cross section as opposed to a curved cross section. For example, the peripheral wall 16 would have a linear cross section extending at an angle from and radially about the base 12.

The pivoting strainer 20 generally comprises a curved structure or surface 36 with is generally concentric with that of the pan 10 and in particular, the upper curved rim 26. However, other countered shapes can be contemplated as alternative versions in order to operably associate with the upper curved rim 26. The pivoting strainer 20 further comprises an upper perimeter 32 terminating at a lip 44, a lower terminating perimeter 34, and a plurality of drainage perforations 38 embedded within the curved surface 36. The pivoting strainer 20 is pivotally attached to the peripheral wall 16 at opposed first and second hinge contact points 28 and 30 forming an axis of rotation Y. In particular, the first and second hinged contact points 28 and 30 allow the pivoting strainer 20 to move between a closed position (see FIG. 1) and a raised, draining position (see FIG. 8) about pivot axis Y. As best illustrated by FIG. 16, while the draining position, the pivoting strainer 20 extends above a limited segment of the peripheral wall 16 and upper curved rim 26 exposing the perforations to the interior contents of the pan 10, thereby enabling the passage of liquid from the interior of the pan to the exterior of the pan. While in the closed position, the pivoting strainer 20 is generally positioned such that it does not interfere with the conventional configuration of the cooking pan and cooking surfaces (see FIG. 3 and FIG. 7). The hinged contact points 28, 30 can be constructed with permanent rivets or removable fasteners as known in the art.

In a preferred configuration, the upper perimeter 32 terminating at a lip 44 is generally concentric in shape to the upper curved rim 26 of the pan, wherein while in the lowered, closed position the lip 44 overlaps the upper curved rim 26 of the peripheral wall 16, thereby preventing the pivoting strainer 20 from rotating downward about the first and second hinged contact points 28, 30 and providing a seal between the peripheral wall 16 and the pivoting strainer 20. In the version, and as best illustrated by FIG. 1 and FIG. 7, the lip 44 concentrically extends flush with the upper curved rim 26 while in the closed position, not intruding into the cooking area.

Similarly, in the preferred version and as shown best in FIG. 16, the lower terminating perimeter 34 is generally concentric in shape to the upper curved rim 26 of the cooking pan 10. Thus, while in the raised, draining position the lower terminating perimeter 34 couples with the upper curved rim 26 by an interference type fit or by friction, thereby preventing the pivoting strainer 20 from moving upward and providing a seal between the pan 10 and the pivoting strainer 20 during the straining process.

The plurality of drainage perforations 38 are embedded within the curved surface 36 of the pivoting strainer 20 in order to allow the passage of liquid from the interior of the cooking pan 10 to the exterior of the pan while the pivoting strainer 20 is in the raised, draining position. The drainage perforations 38 are configured and dimensioned to substantially block the passage of solid food therethrough. In the version, the drainage perforations 38 are a plurality of aligned elongated slits extending upward and vertically within the curvature of the curved surface 36.

Figure 12:
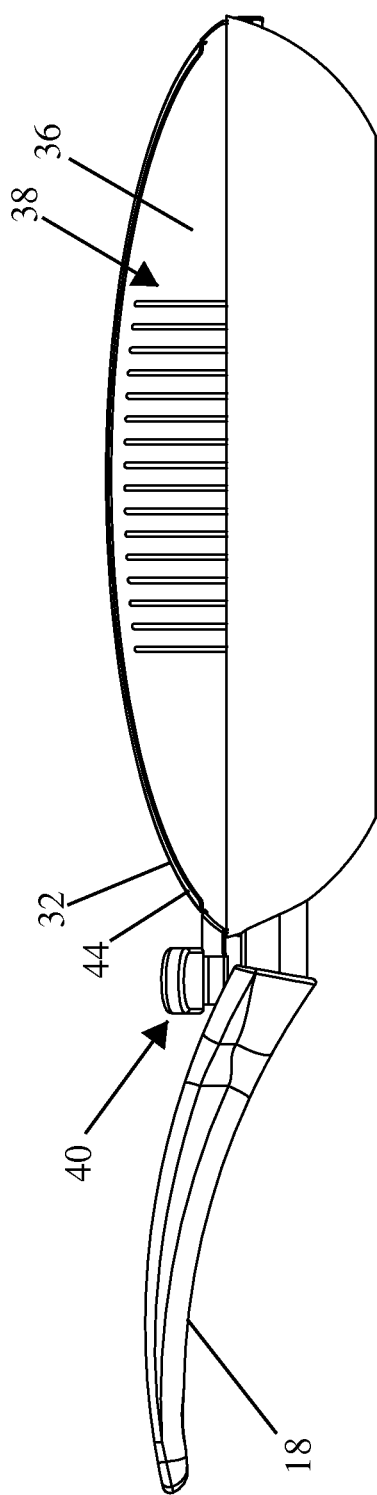
FIG. 12 is a rear side elevation view of the version shown in FIG. 1 while in the draining position.
Figure 13:
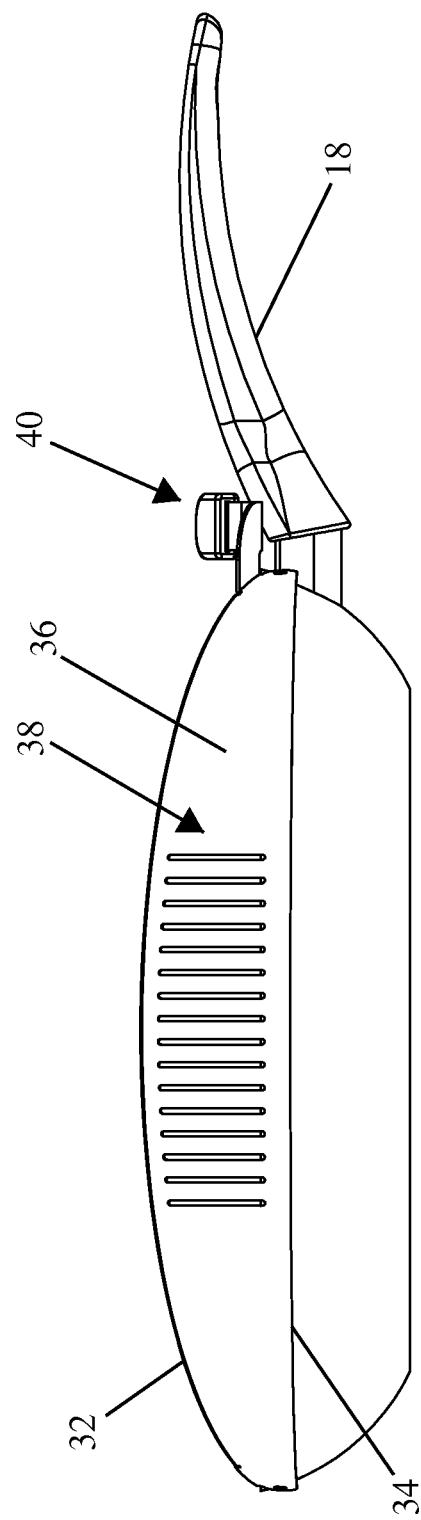
FIG. 13 is a front side elevation view of the version shown in FIG. 1 while in the draining position.
Figure 17:
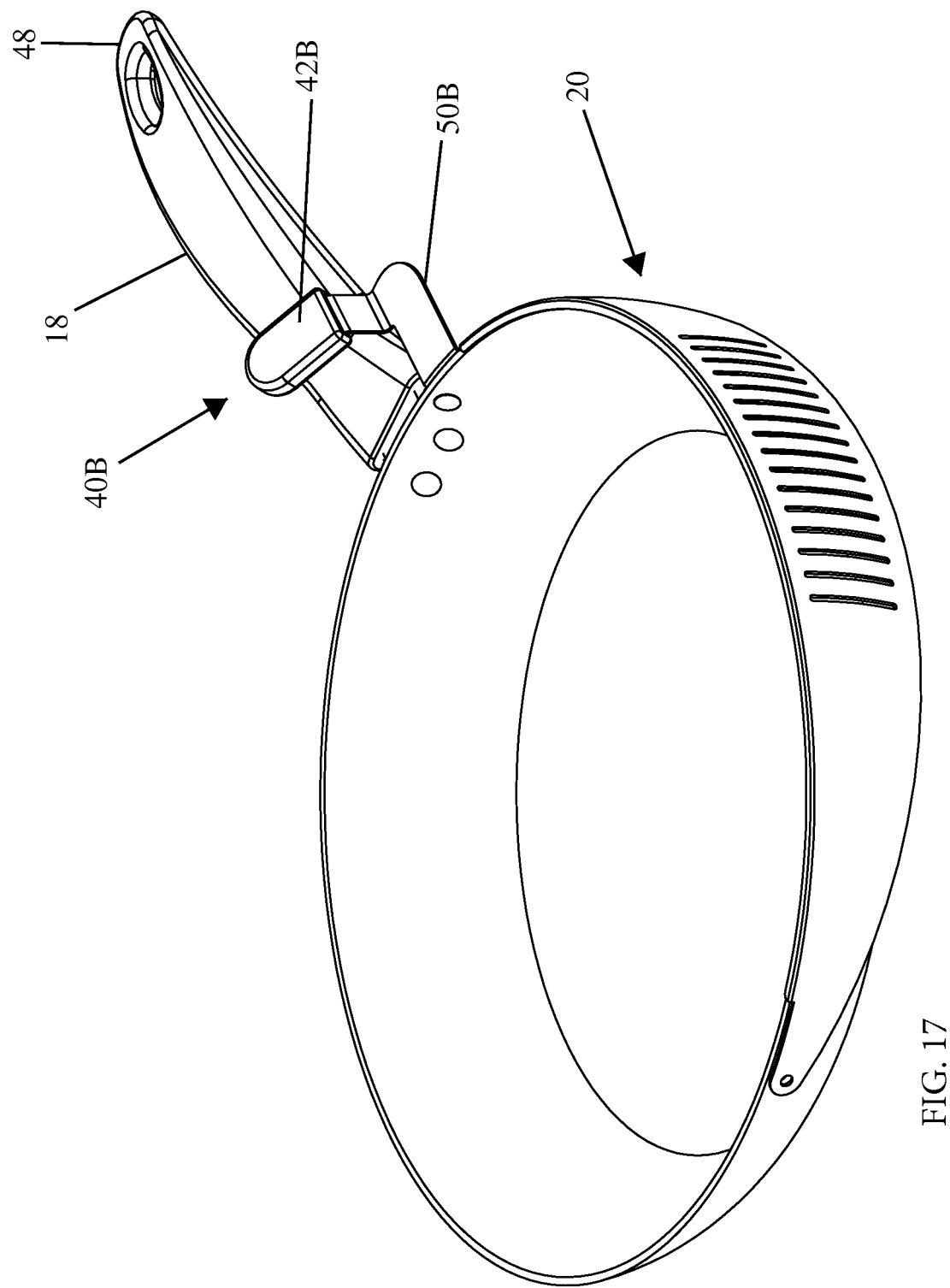
FIG. 17 is a front, side perspective view of a version showing an extended lever white the pivoting strainer is in the closed position.
Figure 18:
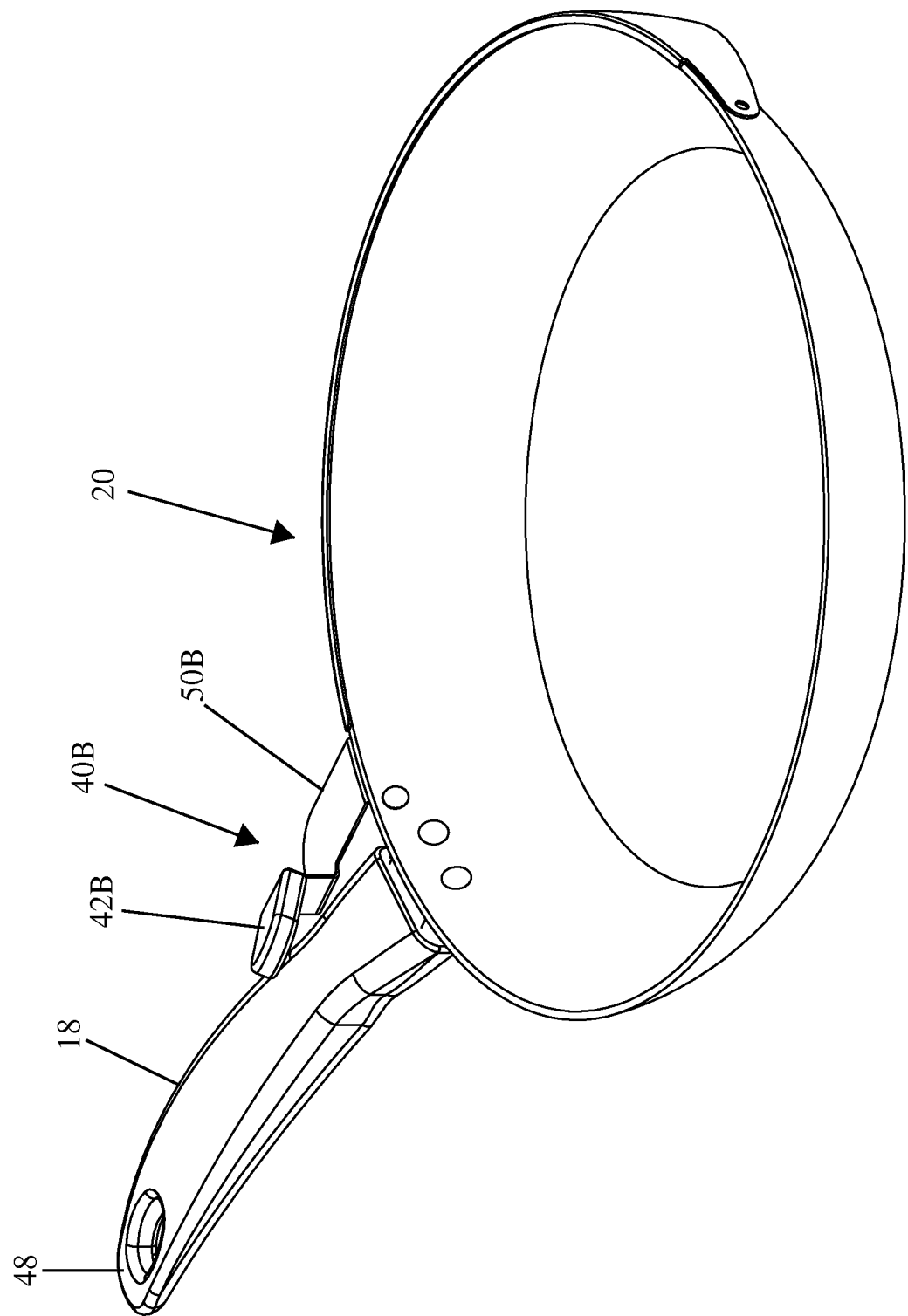
FIG. 18 is a rear, side perspective view of the version shown in FIG. 17.
Figure 19:
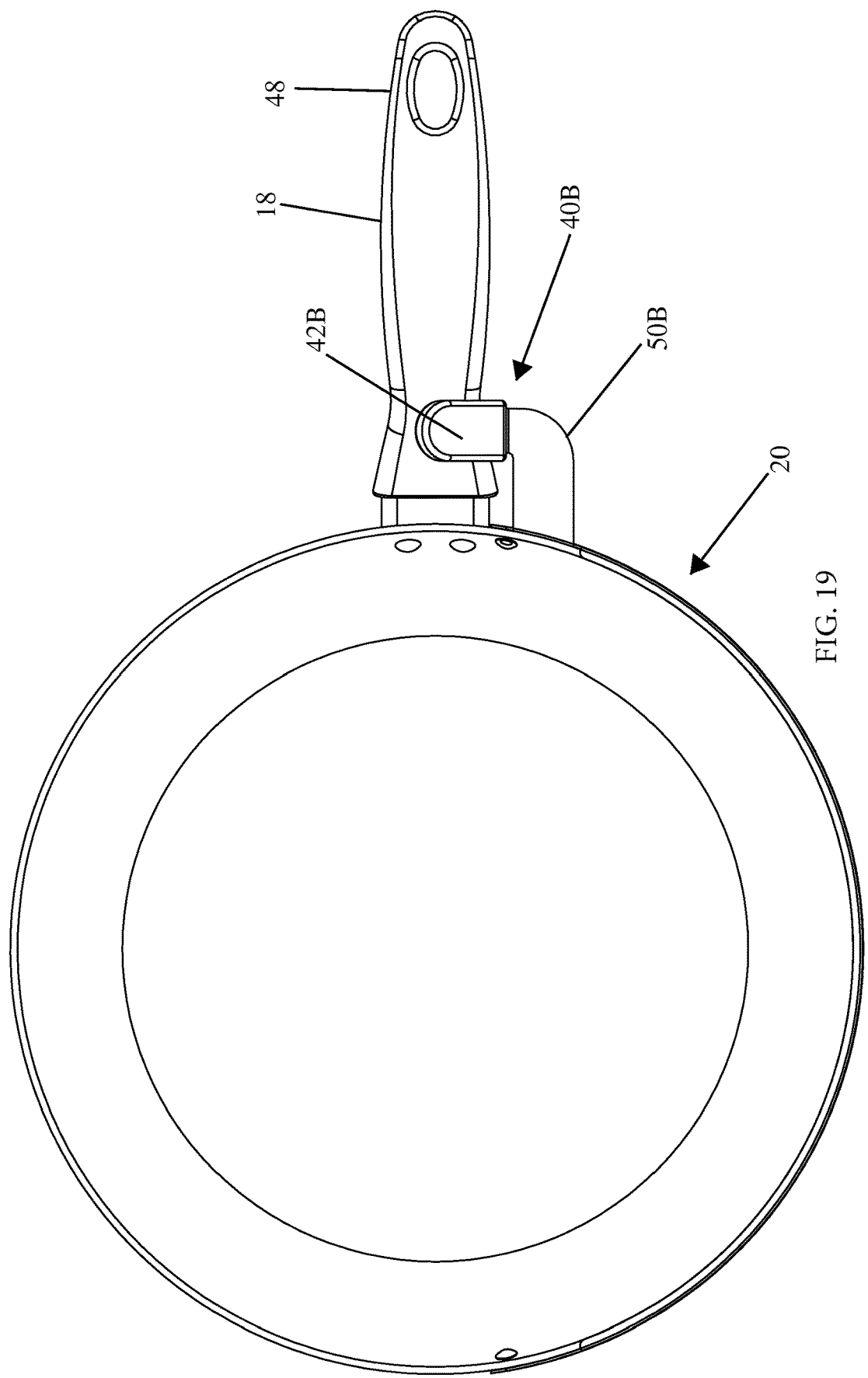
FIG. 19 is a top plan view of the version shown in FIG. 17.
Figure 20:
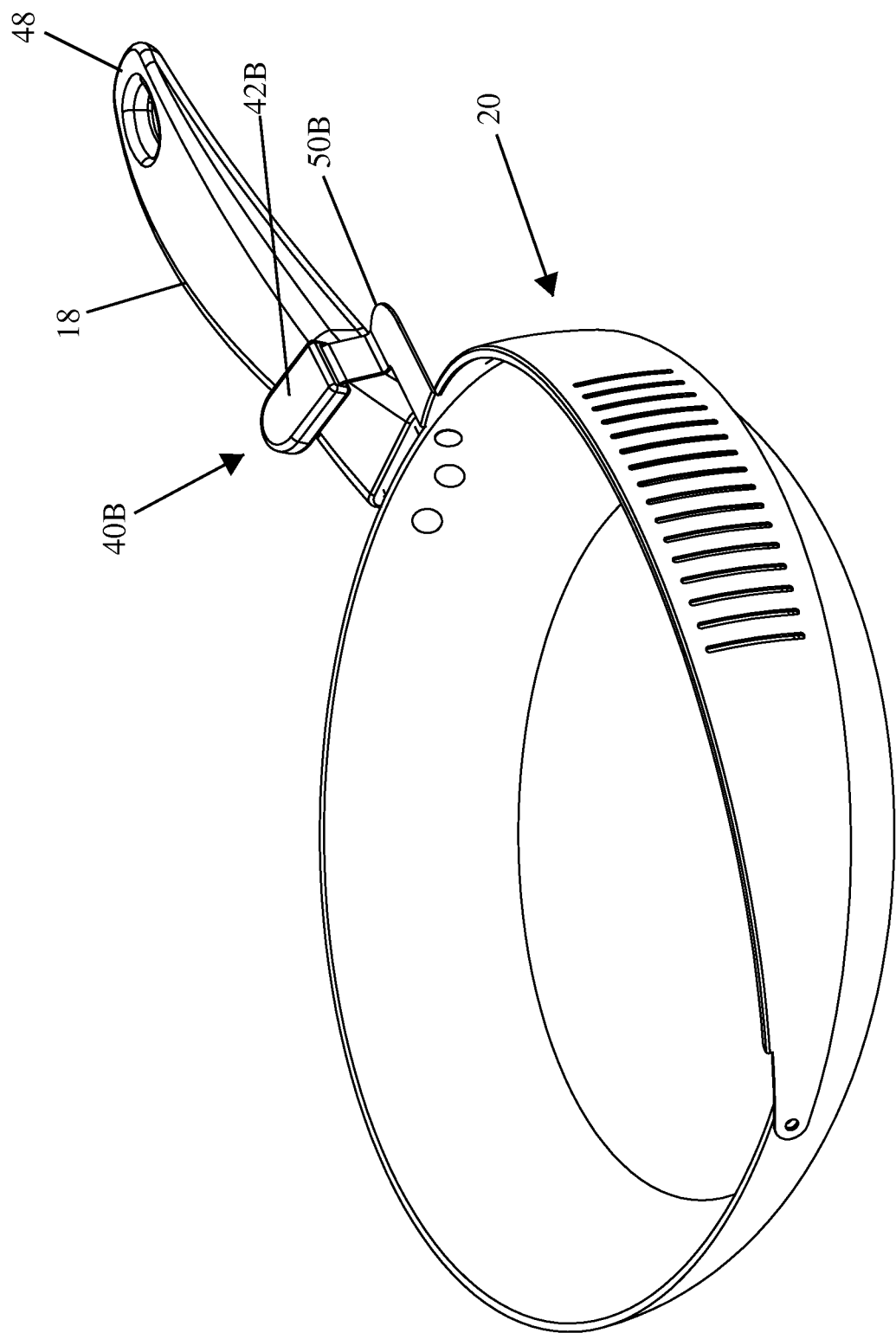
FIG. 20 is a front, side perspective view of the version shown in FIG. 17 showing the pivoting strainer in the draining position.
Figure 21:
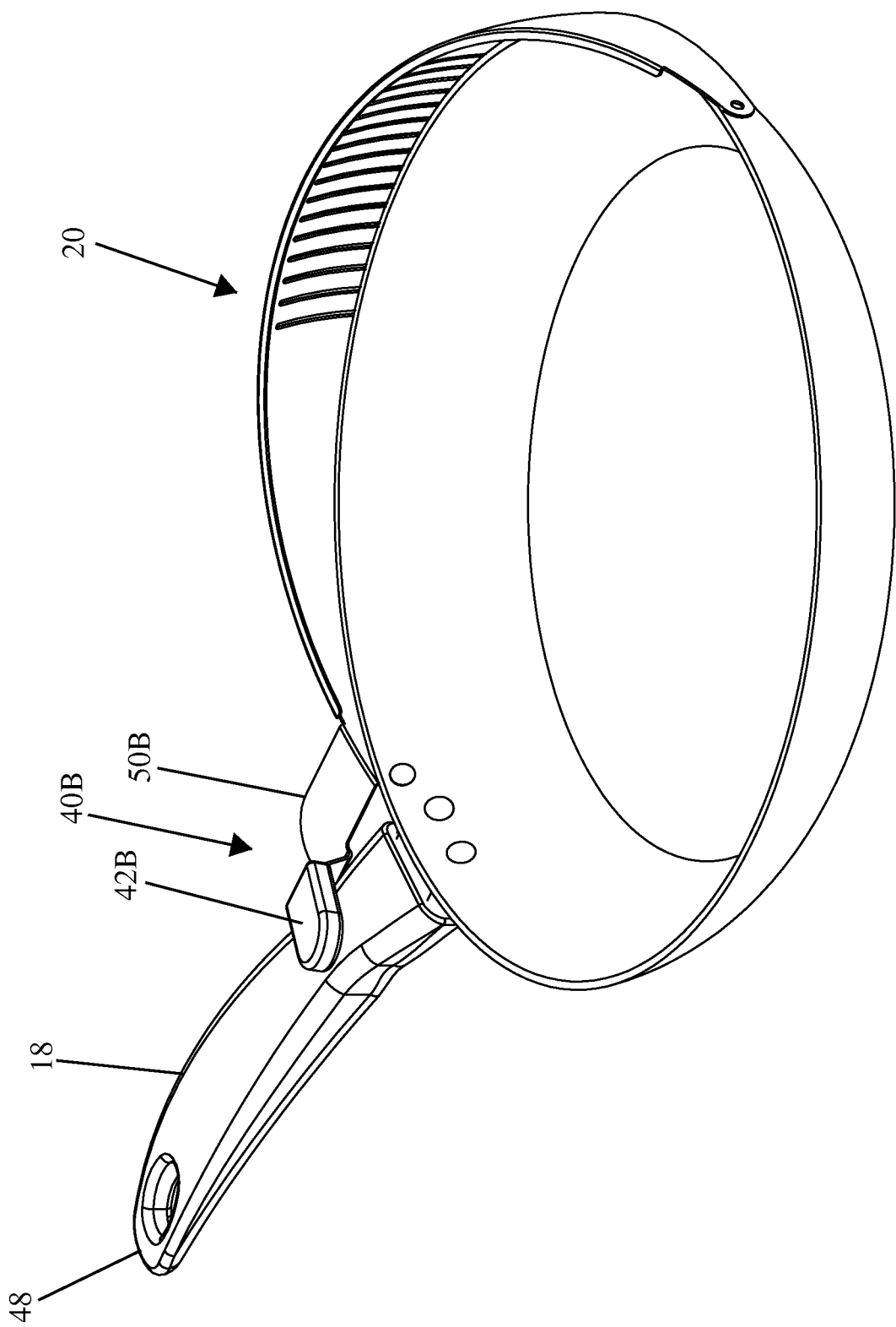
FIG. 21 is a rear, side perspective view of the version shown in FIG. 17 showing the pivoting strainer in the draining position.
Figure 22:
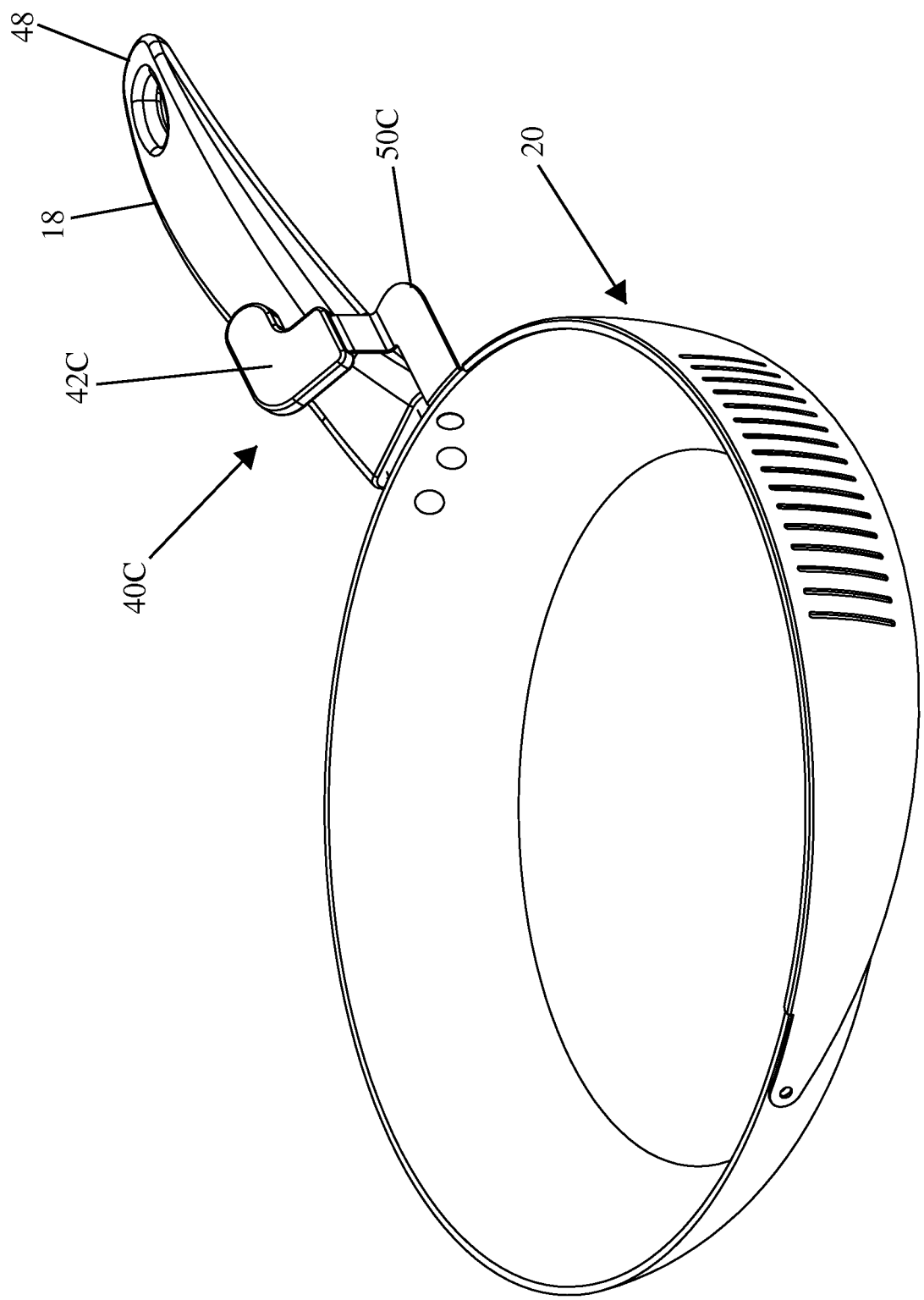
FIG. 22 is a front, side perspective view of a version showing a third version of the lever while the pivoting strainer is in the closed position.
Figure 23:
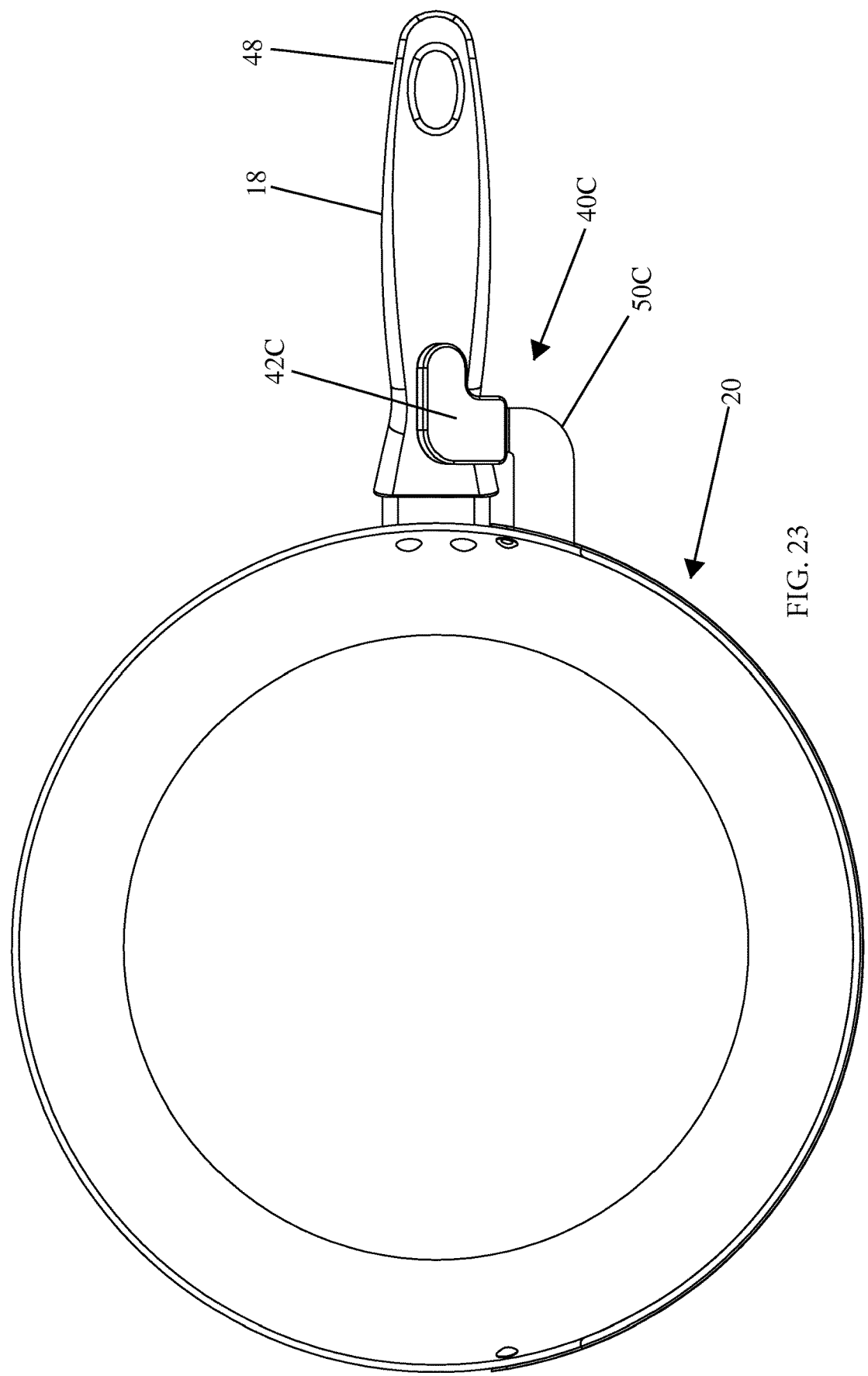
FIG. 23 is a top plan view of the version shown in FIG. 22.
Figure 24:
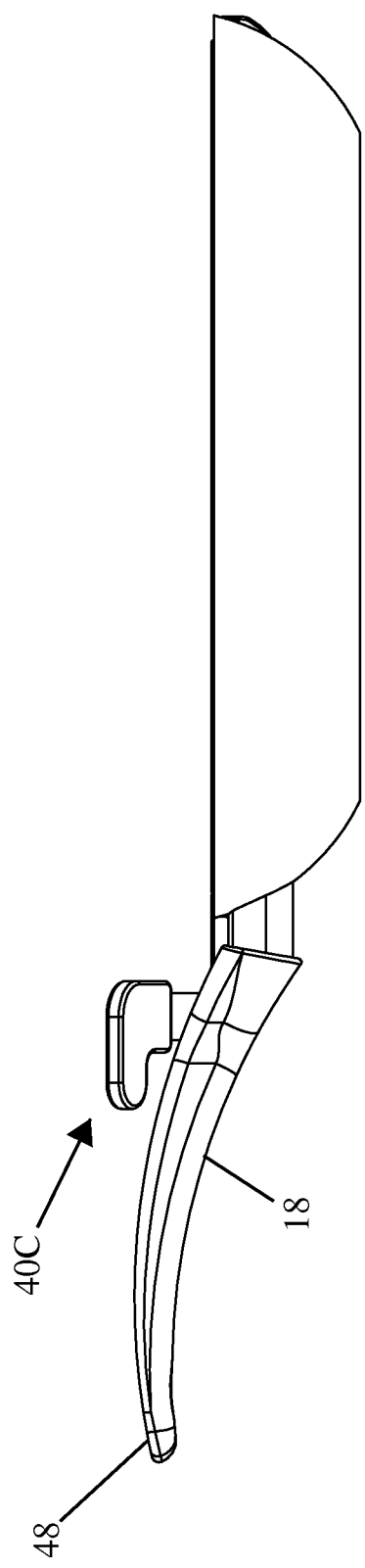
FIG. 24 is a rear elevation view of the version shown in FIG. 22.
Figure 25:
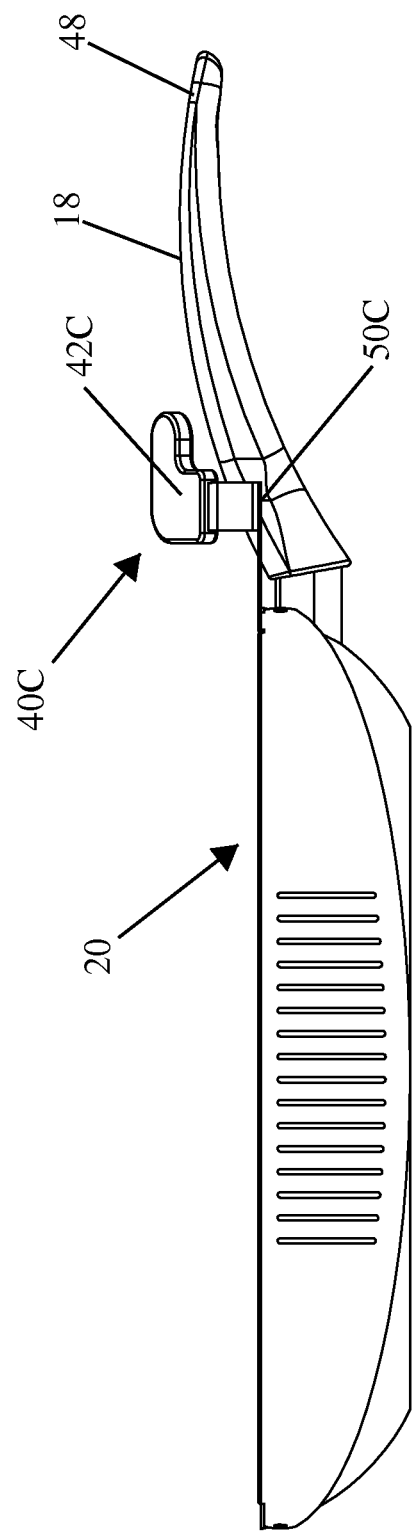
FIG. 25 is a front elevation view of the version shown in FIG. 22.
Figure 26:
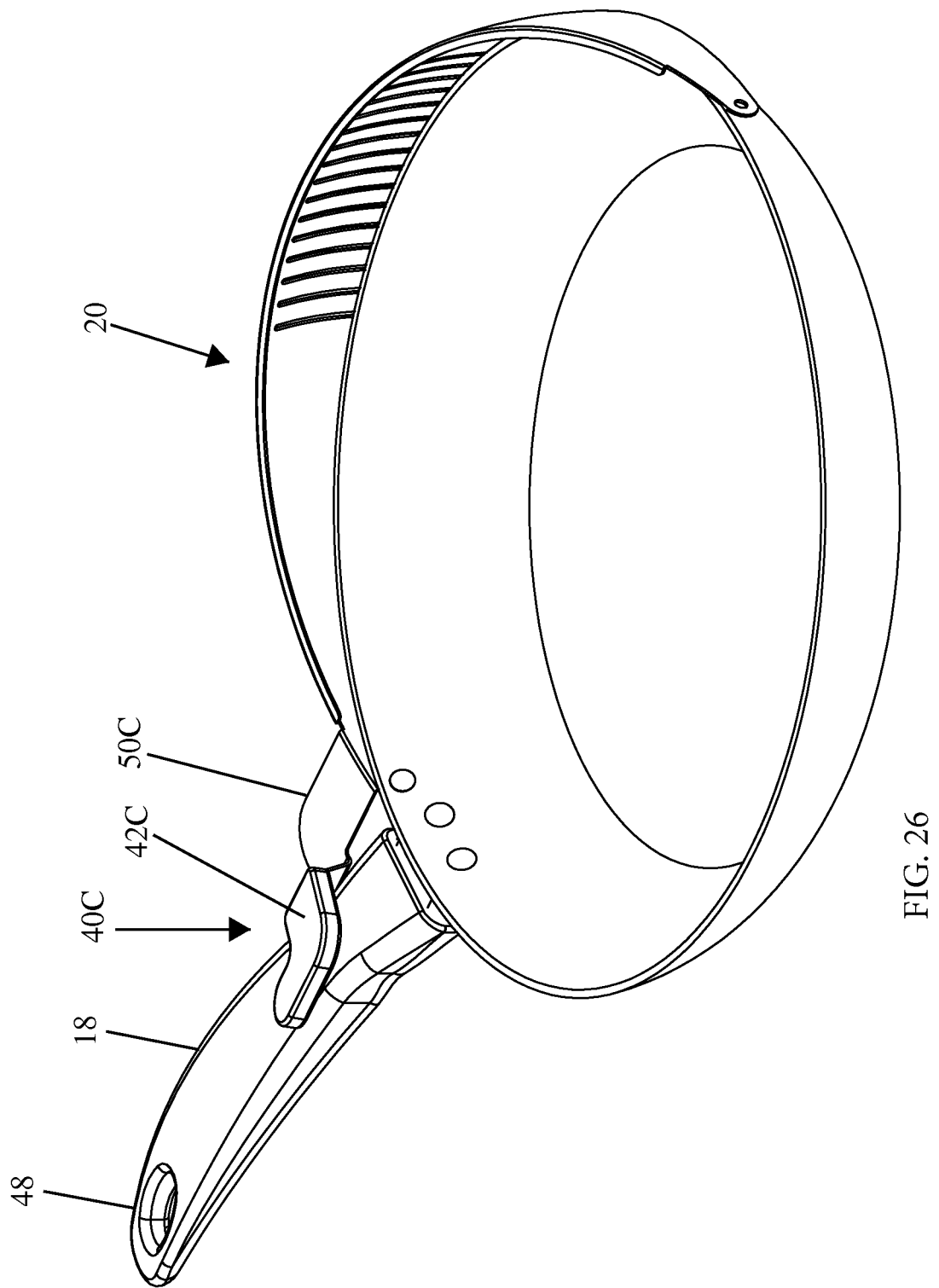
FIG. 26 is a rear, side perspective view of the version shown in FIG. 22 showing the pivoting strainer in the draining position.
Figure 27:
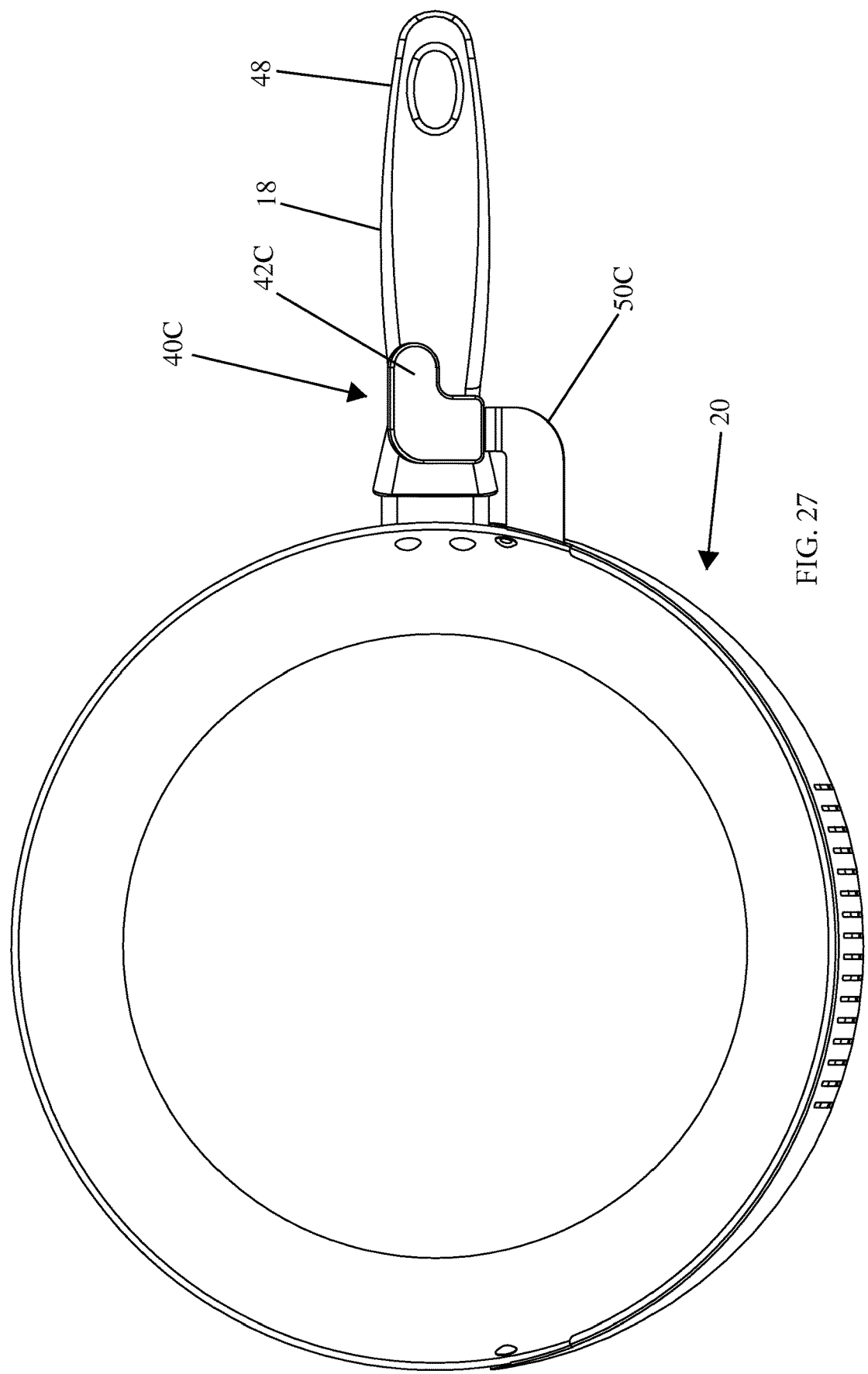
FIG. 27 is a top plan view of the version shown in FIG. 22 showing the pivoting strainer in the draining position.
Figure 28:
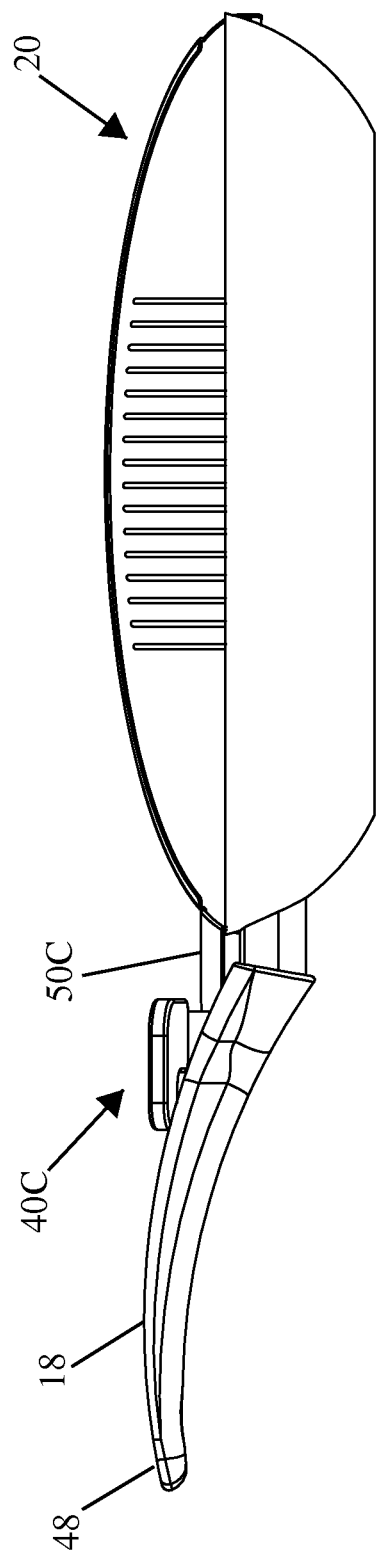
FIG. 28 is a rear elevation view of the version shown in FIG. 22 showing the pivoting strainer in the draining position.
Figure 29:
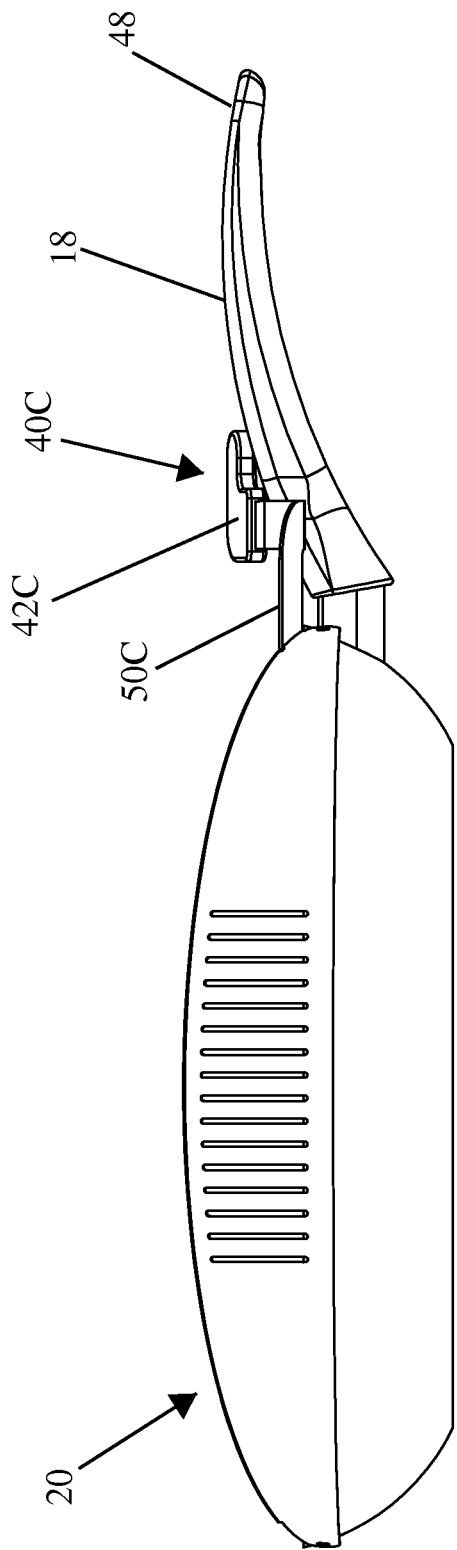
FIG. 29 is a front elevation view of the version shown in FIG. 22 showing the pivoting strainer in the draining position.
Figure 30:
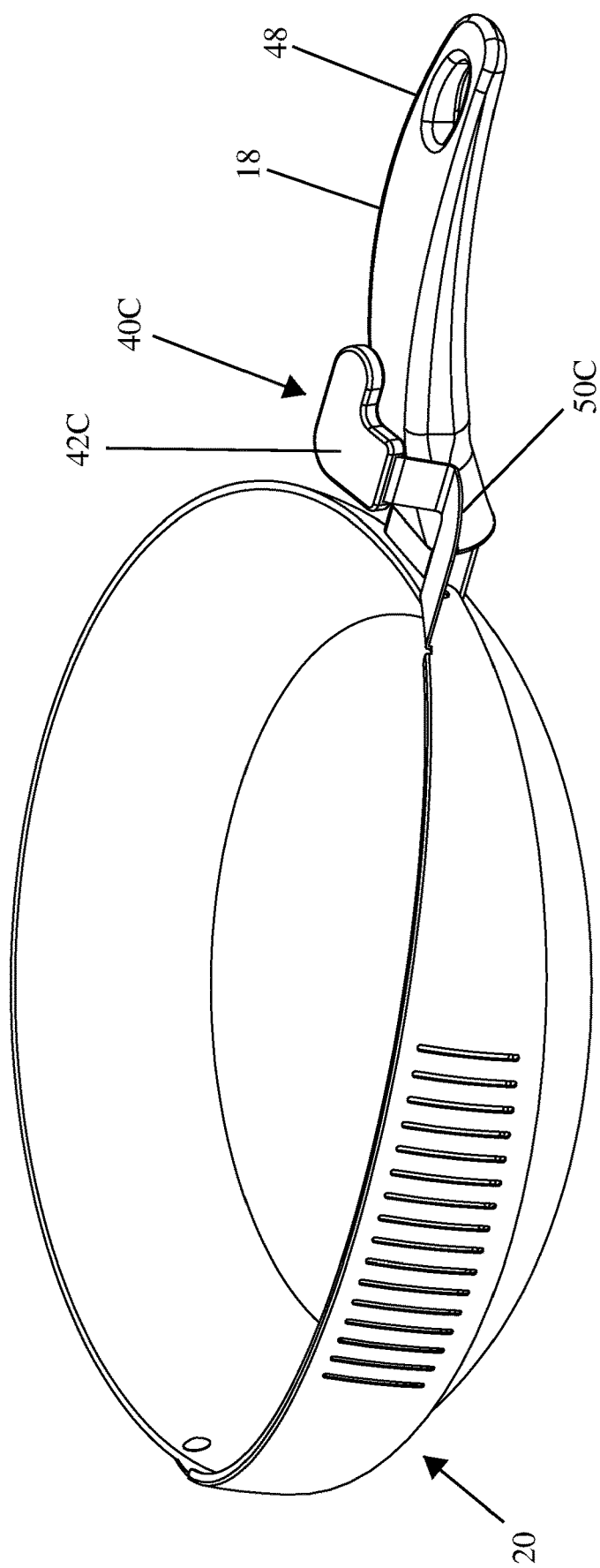
FIG. 30 is a front, side perspective view of the version shown in FIG. 22 while in the draining position.

The pan handle 18 is a supportive member that is sufficiently constructed in order to manipulate and pick up the pan as customarily known in the art. In the version and as best illustrated by FIG. 12 and FIG. 13, the pan handle 18 extends and curves upwardly and outwardly from the peripheral wall 16 generally parallel to the rotating axis of the pivoting strainer and parallel to the outwardly facing plurality of drainage perforations 38 of the pivoting strainer 29. The position of the handle 18 generally places the drainage perforations facing radially outward from the rotational axis of the user's wrist.

Figure 8:
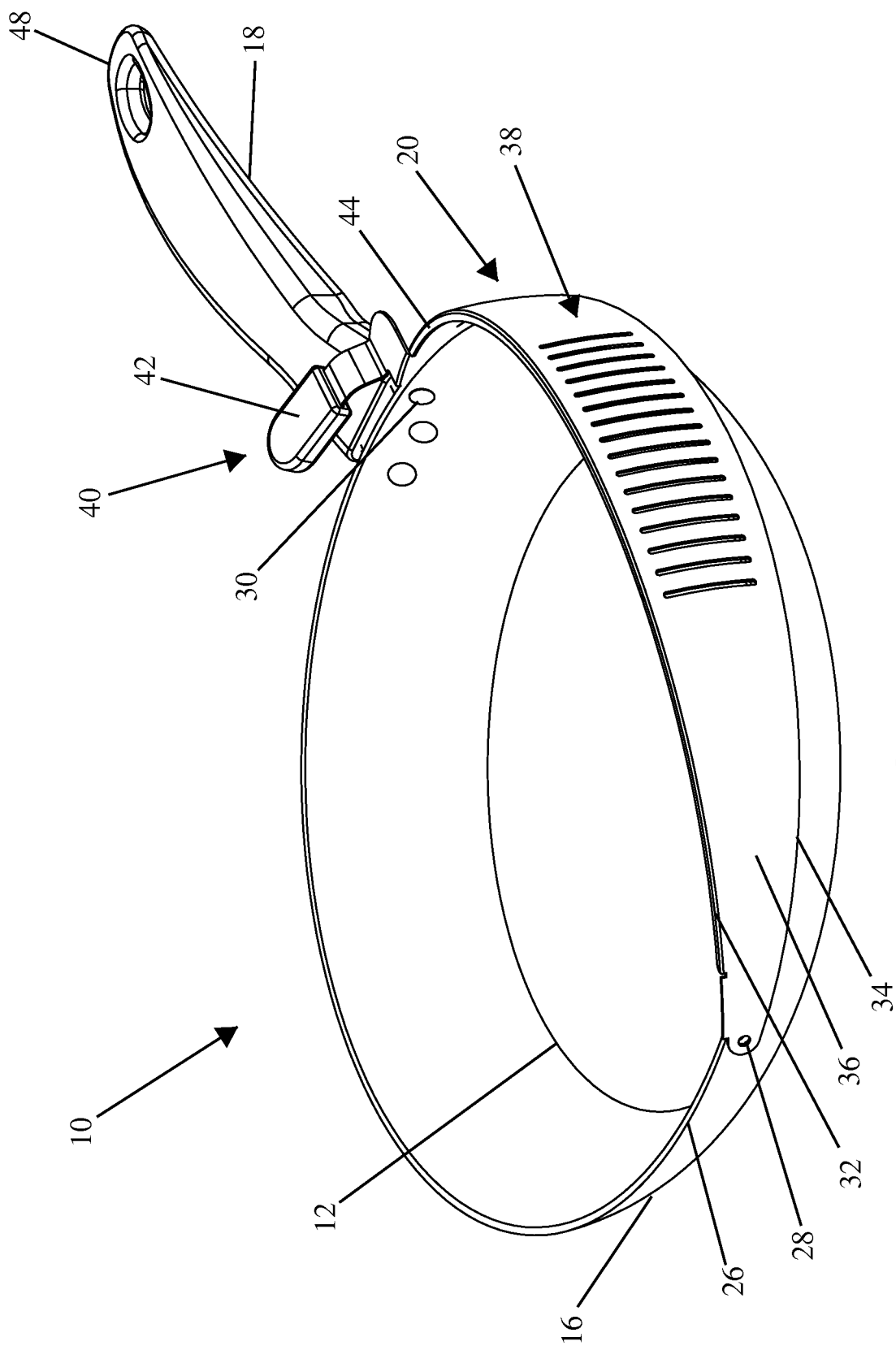
FIG. 8 is a front, side perspective view of the version shown in FIG. 1 showing the pivoting strainer in the draining position.
Figure 9:
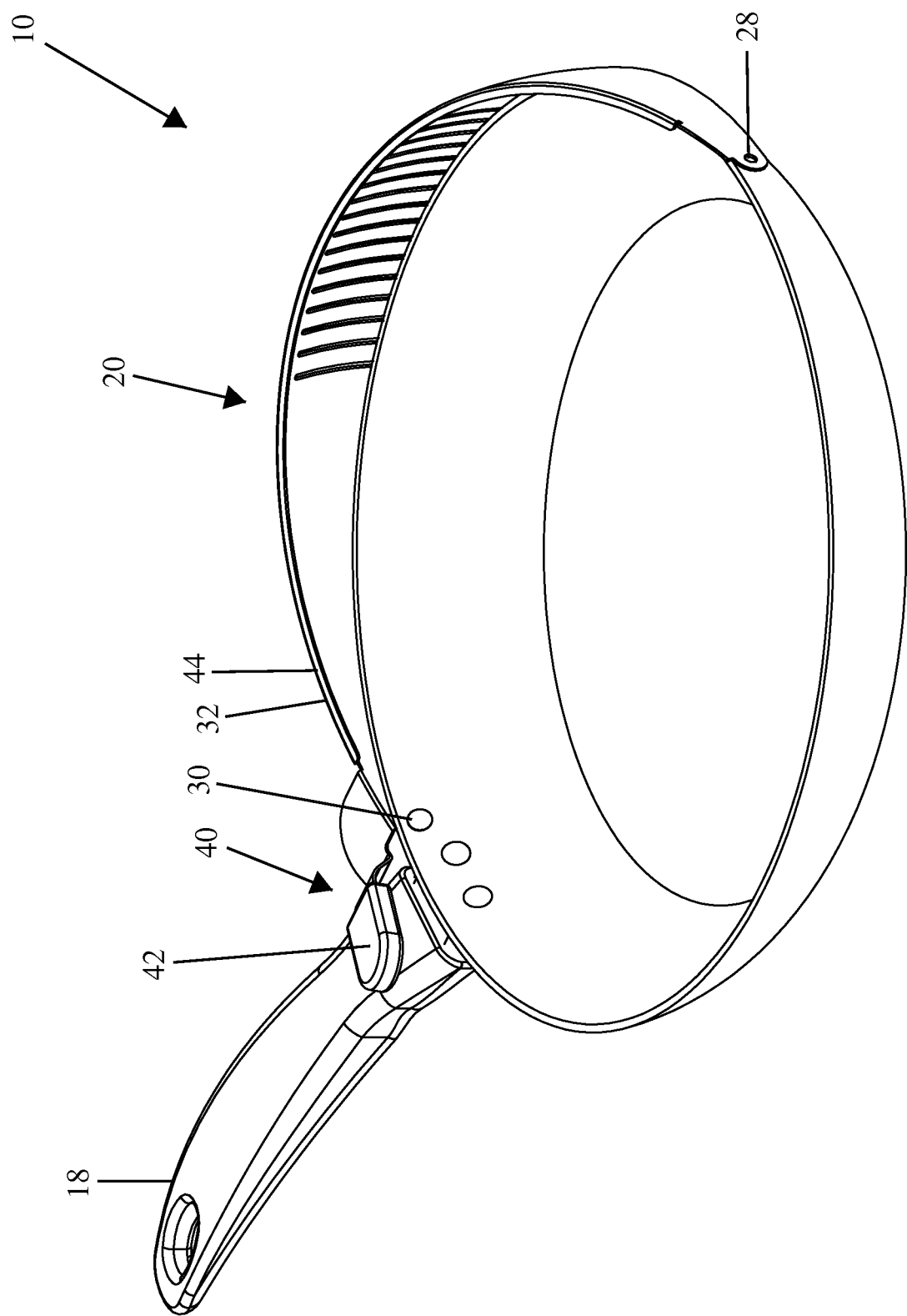
FIG. 9 is a rear, side perspective view of the version shown in FIG. 1 showing the pivoting strainer in the draining position.
Figure 10:
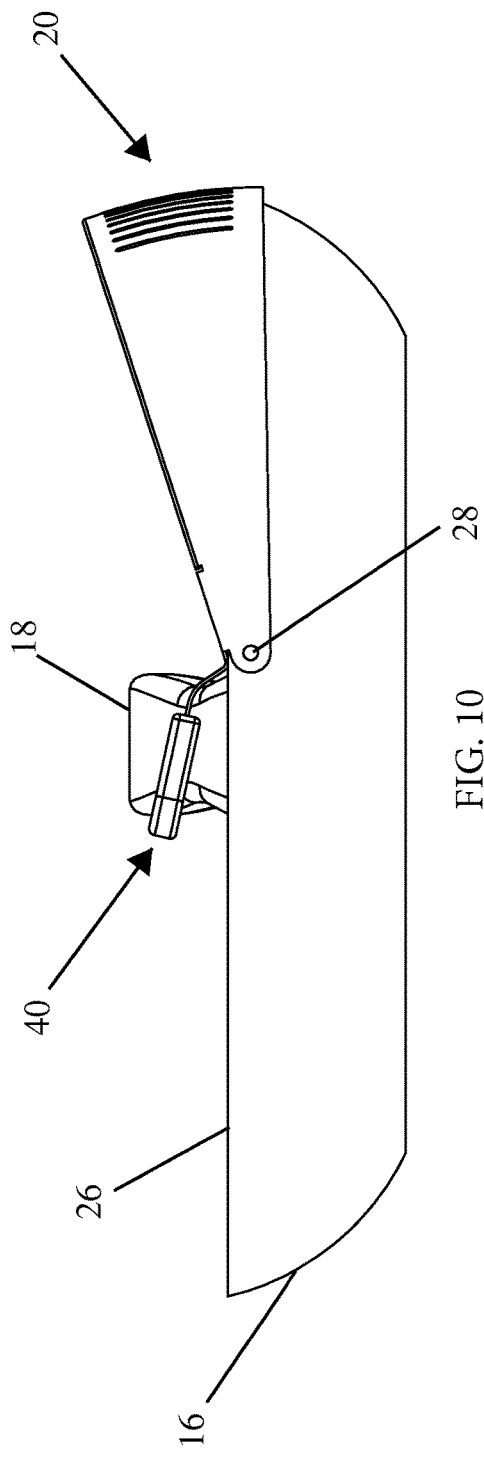
FIG. 10 is a side elevation view of the version shown in FIG. 1 while in the draining position.
Figure 11:
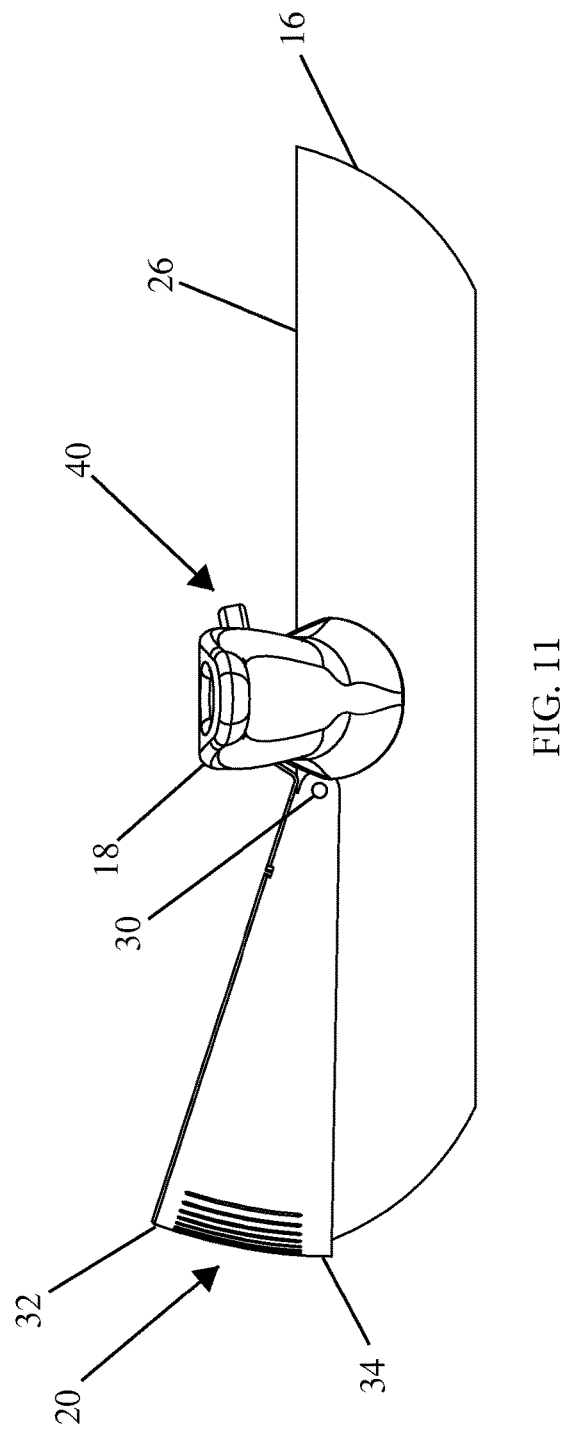
FIG. 11 is a handle side elevation view of the version shown in FIG. 1 while in the draining position.

As best introduced by FIG. 8, the version 10 further comprises a thumb actuated opening lever 40 or a means for moving the pivoting strainer 20 relative to the upper curved rim 26 from the closed position to the draining position. In particular, the opening lever 40 provides the user with the ability to push down with their thumb while simultaneously holding the pan handle 18 in order to move the pivoting strainer 20 into the raised, draining position during operation. In the version, the opening lever 40 is attached near the upper perimeter 32 or lip 44 of the pivoting strainer 20 near and preceding the hinged contact point 30 and the Y pivot axis of rotation. The opening lever 40 extends outside of the pan 10 interior and adjacent the peripheral wall 16 extending over the Y pivot axis and above the pan handle 18 near the position of the user's thumb. Thereby, as the opening lever 40 is depressed by the user's thumb while holding the handle 18, the pivoting strainer pivots about the pivot axis Y moving from the closed position to the draining position.

The opening lever 40 includes a generally flat engagement surface 42 which is suspended overtop of the base 46 of the pan handle 18. Thus, the configuration and position of the opening lever 40 provides the user with the ability to apply a downward force and movement via thumb to the opening lever 40 via the engagement surface 42 generating a rotational action about pivot axis Y moving the pivoting strainer 20 upward and into the raised, draining position during operation.

As illustrated by FIG. 17-FIG. 21, a second version of the means for moving the pivoting strainer or lever is illustrated designated as numeral 40B with all other parts and elements generally the same as previously described and designated as such. The lever 40B is configured to generally extend further towards the end 48 of the pan hand 18 from the pivoting strainer 20 via support member 50B. This positions the engagement surface 42B in close proximity to the user's thumb while the pivoting strainer 20 is not engaged. Moreover, it positions the engagement 42B at a similar altitude of where the user's thumb would be positioned on the upwardly and outwardly extending pan handle 18.

In yet another version as best illustrated by FIG. 22-FIG. 32, a third version of the means for moving the pivoting strainer is illustrated and designated as number 40C with all parts and elements generally the same as previously described and designated as such. Similar to lever 40B, the alternative 40C extends towards the end 48 of the pan handle 18 from the pivoting strainer 20 via support member 50C as well as provides an extension of the engagement surface 42C thereof proximate the user's thumb.

The cooking pan 10 can be made in any manner and of any material chosen with sound engineering judgment. Preferably, materials will be strong, lightweight, long lasting, economic, and ergonomic. Construction of the cooking pan 10 can be made of any known material known in the culinary art such as plastics, cast iron, aluminum, or stainless steel or a combination thereof.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent or similar purpose unless expressly stated otherwise.

What is claimed is:

1. A cooking pan for straining grease and other liquid components away from solid food which can be operated by the use of a single hand, comprising:
   a base having a cooking surface;
   a peripheral wall upstanding from the base terminating with an upper curved rim;
   a handle extending outwardly from the peripheral wall;
   a pivoting strainer defining perforations pivotally attached to the peripheral wall and moveable about a pivot axis relative to the peripheral wall and upper curved rim between i) a draining position wherein the pivoting strainer is positioned exterior of the peripheral wall and external of a container for holding food and extends above the peripheral wall and upper curved rim exposing the perforations to the interior contents of the cooking pan, thereby enabling the passage of liquid from the interior of the pan to the exterior of the pan, and ii) a closed position wherein the pivoting strainer is positioned exterior of the peripheral wall and external of the container for holding food such that it does not interfere with the cooking surfaces, the pivoting strainer pivot axis operably positioned away from the handle by an opening lever; and the opening lever operably attached to the pivoting strainer which is rotatable about the pivot axis and extends above the handle, wherein as the lever is pushed down at an engagement surface above the handle, the pivoting strainer pivots about the pivot axis moving the pivoting strainer upward from the closed position to the draining position.

2. The cooking pan of claim 1, wherein the drainage perforations are configured and dimensioned to block the passage of solid food therethrough.

3. The cooking pan of claim 2, wherein the drainage perforations are a plurality of aligned elongated slits extending upward within the curved surface of the pivoting strainer.

4. The cooking pan of claim 1, wherein the pivoting strainer further comprises a lower terminating perimeter which is concentric to the upper curved rim of the cooking pan, wherein while in draining position the lower terminating perimeter couples with the upper curved rim by an interference type fit, thereby preventing the pivoting strainer from moving upward and providing a seal between the pan and the pivoting strainer during the straining process.

5. The cooking pan of claim 1, wherein the pivoting strainer further comprises an upper perimeter terminating at a lip which is concentric to the upper curved rim of the cooking pan, wherein while in the closed position the lip overlaps the upper curved rim, thereby preventing the pivoting strainer from moving downward and providing a seal between the pan and the pivoting strainer.

6. A cooking pan for straining grease and other liquid components away from solid food which can be operated by the use of a single hand, comprising:
   a substantially flat and circular base having a cooking surface;
   a peripheral wall upstanding from the base terminating with an upper curved rim;
   a handle extending outwardly from the peripheral wall;
   a pivoting strainer defining perforations pivotally attached to the peripheral wall and moveable about a pivot axis relative to the peripheral wall and upper curved rim between i) a draining position wherein the pivoting strainer strainer is positioned exterior of the peripheral wall and external of a container for holding food and extends above the peripheral wall and upper curved rim exposing the perforations to the interior contents of the pan, thereby enabling the passage of liquid from the interior of the pan to the exterior of the pan, and ii) a closed position wherein the pivoting strainer is positioned exterior of the peripheral wall and external of the container for holding food such that it does not interfere with the configuration of the cooking pan and cooking surfaces; the pivoting strainer comprising a lower terminating perimeter which is concentric to the upper curved rim of the pan, wherein while in draining position the lower terminating perimeter couples with the upper curved rim by an interference type fit, thereby preventing the pivoting strainer from moving upward and providing a seal between the pan and the pivoting strainer during the straining process; and an upper perimeter terminating at a lip which is concentric to the upper curved rim of the pan, wherein while in the closed position the lip overlaps the upper curved rim, thereby preventing the pivoting strainer from moving downward and providing a seal between the pan and the pivoting strainer, the pivoting strainer pivot axis positioned away from the handle by an opening lever; and the opening lever operably attached to the pivoting strainer which is rotatable about the pivot axis and extends above the handle, wherein as the lever is pushed down at an engagement surface above the handle, the pivoting strainer pivots about the pivot axis moving the pivoting strainer upward from the closed position to the draining position.

\* \* \* \* \*